United States Patent
Trivedi et al.

(10) Patent No.: US 12,509,373 B2
(45) Date of Patent: Dec. 30, 2025

(54) COMPOSITION AND METHOD FOR THE REMOVAL OF BIOFILM

(71) Applicant: LANXESS Corporation, Pittsburgh, PA (US)

(72) Inventors: Rishi Trivedi, Wilmington, DE (US); Bei Yin, Wilmington, DE (US)

(*) Notice: Subject to any disclaimer, the term of this patent is extended or adjusted under 35 U.S.C. 154(b) by 580 days.

(21) Appl. No.: 17/921,999

(22) PCT Filed: Apr. 23, 2021

(86) PCT No.: PCT/US2021/028741
§ 371 (c)(1),
(2) Date: Oct. 28, 2022

(87) PCT Pub. No.: WO2021/222003
PCT Pub. Date: Nov. 4, 2021

(65) Prior Publication Data
US 2023/0183108 A1    Jun. 15, 2023

Related U.S. Application Data

(60) Provisional application No. 63/017,415, filed on Apr. 29, 2020.

(51) Int. Cl.
*C02F 1/50* (2023.01)
*A01N 35/02* (2006.01)
*A01N 43/16* (2006.01)
*A01P 1/00* (2006.01)
*C02F 103/36* (2006.01)

(52) U.S. Cl.
CPC ............... *C02F 1/50* (2013.01); *A01N 35/02* (2013.01); *A01N 43/16* (2013.01); *A01P 1/00* (2021.08); *A01N 2300/00* (2013.01); *C02F 2103/365* (2013.01); *C02F 2303/04* (2013.01)

(58) Field of Classification Search
CPC .... A01N 35/02; A01N 43/16; A01N 2300/00; A01P 1/00; C02F 1/50; C02F 2103/365; C02F 2303/04
See application file for complete search history.

(56) References Cited

U.S. PATENT DOCUMENTS

| | | | |
|---|---|---|---|
| 7,060,486 B2 | 6/2006 | Wood et al. | |
| 2010/0305132 A1* | 12/2010 | Yin | A01N 43/90 514/642 |
| 2017/0223955 A1* | 8/2017 | Yin | A01N 31/02 |
| 2020/0138024 A1* | 5/2020 | Yin | C02F 1/50 |

OTHER PUBLICATIONS

Kull, F.C.; Eisman, P.C.; Sylwestrowicz, H.D. and Mayer, R.L., in Applied Microbiology 9:538-541 (1961).
International Search Report from corresponding International Application No. PCT/US2021/028741, dated Jul. 1, 2021, two pages.

* cited by examiner

*Primary Examiner* — Patrick Orme

(57) ABSTRACT

The present invention relates to a synergistic composition and method for removing biofilm using glutaraldehyde and analogs of mannose.

8 Claims, No Drawings

COMPOSITION AND METHOD FOR THE REMOVAL OF BIOFILM

The present invention relates to a composition and method for removing biofilm by combining glutaraldehyde with 2-Deoxy-D-Glucose (2DG) or α-Methyl D-Mannoside (αMM) respectively.

Sulfate-reducing prokaryotes (SRPs) are notorious for their detrimental effects on the vast infrastructure required to produce and transport oil and gas. These organisms, known for growing in both planktonic and sessile communities, are some of the major contributors to reservoir souring, microbially influenced corrosion (MIC) of equipment and other mild steel components, and biofilm-induced clogging and restriction of flow. The negative impact of SRPs on both oil production costs and product quality has made these organisms attractive targets for advanced microbial control strategies.

Within the SRPs, bacteria in the genus Desulfovibrio have been demonstrated to be prevalent in oil and gas applications. In particular, Desulfovibrio vulgaris (D. vulgaris) forms robust biofilms that are able to induce pitting corrosion in mild steel. U.S. Pat. No. 7,060,486 discloses that forming biofilm of non-native aerobic bacteria which secrete antimicrobial agents in a system containing SRB may inhibit the growth of SRB in aqueous systems. Although biocidal efficacy and inhibition has been positively demonstrated against SRB, a demand exists for biocide alternatives that are less toxic, more sustainable and demonstrate the ability to disperse existing biofilm.

WO2019/018087 demonstrates that 2-Deoxy-D-glucose and α-Methyl D-Mannoside disperse anaerobic D. vulgaris biofilms. This prior art teaches that high levels of sugar analogs are needed to disperse these biofilms. The present invention solves the problems of the art by demonstrating the the synergistic effect of combining sugar analogs with glutaraldehyde which unexpectantly enables use of lower levels of both the biocide and the sugar analog.

The present invention seeks to solve the problems of the art by providing a synergistic composition useful for the removal of biofilm comprising glutaraldehyde and 2-deoxy-D-glucose. The weight ratio of glutaraldehyde to 2-deoxy-D-glucose is suitably 2.5:1 to 1:60. The present invention also provides a method to remove biofilm comprising providing an aqueous system with a biofilm that comprises at least one sulfate-reducing prokaryote; and contacting the aqueous system with the aforementioned synergistic composition.

The present invention further seeks to solve the problems of the art by providing a synergistic composition useful for the removal of biofilm comprising glutaraldehyde and α-methyl-mannoside. The weight ratio of glutaraldehyde to α-methyl-mannoside is suitably 2.5:1 to 1:60. The present invention also provides a method to remove biofilm comprising providing an aqueous system that comprises a biofilm with at least one sulfate-reducing prokaryote; and contacting the aqueous system with the aforementioned synergistic composition of glutaraldehyde and α-methyl-mannoside.

As used herein, "biofilm" is defined as a multicellular bacterial community composed of surface-associated microbial cells that are held together by a self-developed matrix of extracellular polymeric substance. The concentration of bacteria is different in biofilm than in solution.

As used herein "removal of biofilm" is defined as the dispersal and/or destruction of a formed biofilm by determining % biomass remaining after treatment against no-treatment control. These % biomass values of sugar and glutaraldehyde combinations were compared against the no treatment control, and success criterion for statistically significant reduction of biofilm was determined based on $p\text{-value} < 0.05$.

Combinations of glutaraldehyde and 2-Deoxy-D-Glucose (2DG) or α-Methyl-Mannoside (αMM) to synergistically remove biofilm compared to equivalent concentrations of glutaraldehyde, 2-Deoxy-D-Glucose (2DG) or α-Methyl-Mannoside (αMM) alone.

Biofilm is found in aqueous systems such as, for example, industrial wastewater systems and waters resulting from oil and gas operations.

Biofilm comprises prokaryotes. Suitable prokaryotes are bacteria, preferably primarily anaerobic bacteria. The biofilms of the present invention may primarily comprise sulfate-reducing prokaryotes (SRPs), suitably sulfate reducing bacteria. Such sulfate reducing bacteria may be of the Desulfovibrio genus, and in particular, Desulfovibrio vulgaris (ATCC 29579), Desulfovibrio desulfuricans (DSM 12129) or mixtures thereof.

To disperse the biofilms, the biofilms are contacted with a compound selected from the group consisting of 2-deoxy-D-glucose (2DG) and methyl α-D-mannopyranoside (αMM), with glutaraldehyde. Useful concentrations of 2DG and αMM and its derivatives range from 10 to less than 2000 ppm, alternatively 25 to 1500 ppm, alternatively 50 to 1000 ppm, alternatively 100 to 800 ppm, alternatively 200 to 600 ppm, and alternatively 300 to 500 ppm. Useful concentrations of glutaraldehyde range from 25 to 1000 ppm, alternatively 50 to 750 ppm, alternatively 50 to 500 ppm, alternatively 25 to 250 ppm, and alternatively 25 to 100 ppm. All component range endpoints herein are inclusive and combinable.

The following examples are provided for illustrative purposes only and are in no way intended to limit the scope of the present invention beyond the scope aforementioned in the specification. Any ratio described herein is a weight/weight ratio unless otherwise specified.

EXAMPLES

Microbicidal Composition

Example: Biofilm Removal Synergy with 2Dg

Stock Culture Preparation

A lyophilized D. vulgaris pure culture received from ATTCC was resuspended in 500 ul of MB 1249. Aseptically, the content was transferred to a 5¬mL tube of MB1249 medium. The culture was incubated in an anaerobic chamber at 30° C. for 72 hrs. Subsequently, a stock culture with a final concentration of 25% glycerol was prepared by adding equal volumes of culture and 50% glycerol. 1 ml of culture was then transferred to 2-ml cryogenic vials and stored AT-80c. The purity of the stock culture was evaluated through PCR, by amplifying the 16S rDNA region, and thus, it was verified that the original ATCC sample was a pure culture.

A 10% culture was prepared by taking 1 mL of stock culture and adding it to 9 mL of MB1249, then the culture was placed into a 30° C. side incubator within the chamber and incubated for 72 hours. After 72 hours of incubation, the 10-ml D. vulgaris culture was added to 40 ml of MB1249 medium and incubated for 48 hours. After the incubation time, the optical density of the culture was determined by taking 100 µL of culture and adding it to 900 µL of MB1249 in a cuvette. Another cuvette was filled with 1 mL of MB1249 for a blank. Then, each of culture cuvettes were read and their optical density (O.D.) was recorded by using the Thermofisher Spectronic 200 Spectrophotometer at 620 nm. Using a C1V1=C2V2 calculation and the optical density, the final concentration of culture added to the 96 well plates was ~0.1 O.D. Then, NUNC Round bottom 96 well plates were filled with culture and anaerobic PBS+10% MB1249. The plates were placed into the side incubator of the anaerobic chamber at 30° C. for 24 hours to form biofilm.

TABLE 1

Preparation of MB1249 media
MB 1249 (pH 7.5)

| Chemical | Amount (g/L) | Chemical Source |
|---|---|---|
| MgSO4 | 2 | Fisher |
| Na-Citrate | 5 | Fisher |
| CaSO4 × 2H$_2$O | 1 | Fisher |
| NH4Cl | 1 | Fisher |
| K2HPO$_4$ | 0.5 | Fisher |
| Na-Lactate | 3.5 | Fisher |
| Yeast Extract | 1 | Fisher |
| Na-Thioglycolate | 0.1 | Sigma Aldrich |
| DI H2O | 985.9 | |

Removal Biocide Treatment Plate Preparation—Anaerobic

After 24 hours of incubation at 30° C., all plates were removed from the incubator and the volume from each well was taken out with a multi-channel pipette. Then, the wells were re-filled with PBS+10% MB1249 and treatments.

The sugar analogues used in the treatment were α-Methyl D-Mannoside (αMM) and 2-Deoxy-D-Glucose (2DG). Both αMM and 2DG were purchased from Sigma. Stocks were prepared (W/V) by weighing sugar and adding anaerobic water inside the anaerobic chamber. The Glutaraldehyde, AQUCAR™ GA50 ("Glutaraldehyde"), was prepared outside of the chamber (V/V) as a safety measure. Each of the components were added at their respective concentrations for a final volume of 200 ul per well. In Table 3, the concentrations used for the synergy experiments are listed. Each experiment was done with at least six replicates for different treatments and at least 8 replicates for non-treatment controls.

Plates were then sealed with a titer-top and placed into anaerobic boxes with a gas pack. Then, incubated in an aerobic shaking incubator, 30° C. at 115 RPM. After 24 hours, the plates were processed using a Crystal Violet Assay.

Crystal Violet Assay

After 24 hours of treatment, all the treatment solution was gently removed from plates using a multi-channel pipette. Then, 250 μL of DI water was re-filled into the wells. This step was then repeated so the plates were each rinsed twice. If residual DI water was in plates, they were inverted and gently patted onto a thick paper towel. Then, the plates were air dried in a ventilated hood.

To fix the biofilm in the wells, 250 μL per well of methanol was used, waiting time 5 minutes. This methanol was then removed and allowed to air dry. Lastly, 250 μL per well of 0.1% Crystal Violet Solution was used to stain the biofilm in the plates for 5 minutes. Then, using a multi-channel pipette, the stain was removed, and the rinse step was repeated. The plates were allowed to air dry one final time. Then, 250 μL of methanol was used to extract stained biofilm from well walls, mixing gently to break up clumps. Then, the plates were placed into the Biotek Cytation 5, and the optical density (OD) was read at 600 nm. OD measurements were used to determine % biomass against control by calculating the ratio of sugar and glutaraldehyde combinations against respective no-treatment control within the same plate to minimize plate to plate variations. These % biomass values of sugar and glutaraldehyde combos were compared against glutaraldehyde-alone treatment, and success criterion was determined based on p-value calculations. P-values were calculated by comparing at-least 6 replicates for various combinations against glutaraldehyde-alone replicates, and glutaraldehyde combinations with p-values less than 0.05 demonstrated a statistically significant removal of biofilm.

Table 2 summarizes the efficacy of αMM and glutaraldehyde and their combinations, as well as the Synergy Index of each combination, while Table 3 summarizes the efficacy of 2DG and glutaraldehyde and their combinations. One measure of synergism is the industrially accepted method described by Kull, F. C.; Eisman, P. C.; Sylwestrowicz, H. D. and Mayer, R. L., in Applied Microbiology 9:538-541 (1961), using the ratio determined by the formula:

$$Q_a/Q_A + Q_b/Q_B = \text{Synergy Index ("SI")}$$

Wherein:
Qa=Concentration of biocide A required to achieve significant biomass reduction when used in combination with B
QA=Concentration of biocide A required to achieve significant biomass reduction when used alone
Qb=Concentration of biocide B required to achieve significant biomass reduction when used in combination with A
QB=Concentration of biocide B required to achieve significant biomass reduction when used alone When the sum of Qa/QA and Qb/QB is greater than 1.0, antagonism is indicated. When the sum is 1.0, additivity is indicated, and when less than 1.0, synergism is demonstrated.

TABLE 2

Concentrations of αMM and Glutaraldehyde in the synergy experiments.
(*Desulfovibrio vulgaris*)
In Standalone experiments

| Chemical | Concentration (ppm) | % OD compared to no-treatment control |
|---|---|---|
| Glutaraldehyde | 2500 | 97.4 |
| αMM | 2000 | 100.3 |

In Experiment Combinations (Listed in Ppm)

| Glutaraldehyde | αMM | Ratio | % OD compared to no-treatment control | p-value | Synergy index |
|---|---|---|---|---|---|
| 25 | 2000 | 1/80 | 90.7 | 0.00264 | 1.01 |
| 25 | 1500 | 1/60 | 87.4 | 0.00010 | 0.76 |
| 25 | 1250 | 1/50 | 93.4 | 0.02036 | 0.64 |
| 25 | 1000 | 1/40 | 83.1 | <.00001 | 0.51 |
| 25 | 750 | 1/30 | 80.7 | <.00001 | 0.39 |
| 25 | 500 | 1/20 | 65.6 | <.00001 | 0.26 |
| 25 | 400 | 1/16 | 65.5 | <.00001 | 0.21 |
| 25 | 300 | 1/12 | 62.9 | <.00001 | 0.16 |
| 25 | 250 | 1/10 | 78.3 | <.00001 | 0.14 |
| 25 | 200 | 1/8 | 59.2 | <.00001 | 0.11 |
| 25 | 100 | 1/4 | 63.0 | <.00001 | 0.06 |
| 25 | 75 | 1/3 | 80.9 | <.00001 | 0.05 |
| 25 | 50 | 1/2 | 66.8 | <.00001 | 0.04 |

| Glutaral-dehyde | αMM | Ratio | % OD compared to no-treatment control | p-value | Synergy index |
|---|---|---|---|---|---|
| 25 | 25 | 1/1 | 82.2 | <.00001 | 0.02 |
| 25 | 10 | 1/0.4 | 82.0 | <.00001 | 0.02 |
| 25 | 0 |  | 99.3 | 0.742879 | — |

TABLE 3

Concentrations of 2DG and Glutaraldehyde in the synergy experiments. (*Desulfovibrio vulgaris*)
In Standalone experiments

| Chemical | Concentration (ppm) | % OD compared to no-treatment control |
|---|---|---|
| Glutaraldehyde | 2500 | 97.4 |
| 2DG | 2000 | 101.7 |

In Experiment Combinations (Listed in Ppm)

| Glutaral-dehyde | 2DG | Glutaraldehyde/2DG ratio | % OD compared to no-treatment control | p-value | Synergy Index |
|---|---|---|---|---|---|
| 25 | 2000 | 1/80 | 79.1 | 0.0001 | 1.01 |
| 25 | 1500 | 1/60 | 76.4 | 0.0001 | 0.76 |
| 25 | 1250 | 1/50 | 84.2 | 0.0001 | 0.635 |
| 25 | 1000 | 1/40 | 75.2 | <.00001 | 0.51 |
| 25 | 800 | 1/32 | 72.8 | <.00001 | 0.41 |
| 25 | 750 | 1/30 | 79.8 | 0.0001 | 0.385 |
| 25 | 600 | 1/24 | 68.5 | <.00001 | 0.31 |
| 25 | 500 | 1/20 | 75.5 | 0.0001 | 0.26 |
| 25 | 400 | 1/16 | 69.3 | <.00001 | 0.21 |
| 25 | 250 | 1/10 | 69.8 | <.00001 | 0.135 |
| 25 | 200 | 1/8 | 72.0 | <.00001 | 0.11 |
| 25 | 100 | 1/4 | 61.5 | <.00001 | 0.06 |
| 25 | 75 | 1/3 | 77.7 | 0.0001 | 0.0475 |
| 25 | 50 | 1/2 | 71.2 | <.00001 | 0.035 |

| Glutaral-dehyde | 2DG | Glutaraldehyde/2DG ratio | % OD compared to no-treatment control | p-value | Synergy Index |
|---|---|---|---|---|---|
| 25 | 25 | 1/1 | 78.7 | 0.0001 | 0.0225 |
| 25 | 10 | 2.5/1 | 75.3 | 0.0001 | 0.015 |
| 25 | 0 |  | 92.7 | 0.023 | — |

What is claimed is:

1. A synergistic composition useful for the removal of biofilm comprising:
   i) glutaraldehyde; and
   ii) 2-deoxy-D-glucose.

2. The synergistic composition of claim 1 wherein the weight ratio of glutaraldehyde to 2-deoxy-D-glucose is 2.5:1 to 1:60.

3. A method to remove biofilm comprising:
   i. providing an aqueous system that comprises a biofilm with at least one sulfate-reducing prokaryote; and
   ii. contacting the biofilm with the synergistic composition of claim 1.

4. The method of claim 3 wherein the sulfate-reducing prokaryote comprises *Desulfovibrio vulgaris*.

5. A synergistic composition useful for the removal of biofilm comprising:
   i) glutaraldehyde; and
   ii) α-methyl-mannoside.

6. The synergistic composition of claim 5 wherein the weight ratio of glutaraldehyde to α-methyl-mannoside is 2.5:1 to 1:60.

7. A method to remove biofilm comprising:
   i. providing an aqueous system that comprises at least one sulfate-reducing prokaryote; and
   ii. contacting the aqueous system with the synergistic composition of claim 5.

8. The method of claim 7 wherein the sulfate-reducing prokaryote comprises *Desulfovibrio vulgaris*.

* * * * *